(12) United States Patent
Cyr

(10) Patent No.: US 12,705,072 B1
(45) Date of Patent: Aug. 11, 2026

(54) USER DEVICES WITH DIRECTIONAL NETWORKING FOR DISCOVERABILITY

(71) Applicant: Matthew Cyr, Berlin, CT (US)

(72) Inventor: Matthew Cyr, Berlin, CT (US)

( * ) Notice: Subject to any disclaimer, the term of this patent is extended or adjusted under 35 U.S.C. 154(b) by 185 days.

(21) Appl. No.: 18/417,859

(22) Filed: Jan. 19, 2024

Related U.S. Application Data

(60) Provisional application No. 63/440,875, filed on Jan. 24, 2023.

(51) Int. Cl.

| | |
|---|---|
| ***G06F 9/451*** | (2018.01) |
| ***G06F 3/04817*** | (2022.01) |
| ***G06F 3/0484*** | (2022.01) |
| ***G06F 3/14*** | (2006.01) |
| ***H04L 67/141*** | (2022.01) |

(52) U.S. Cl.
CPC .......... *G06F 9/451* (2018.02); *G06F 3/04817* (2013.01); *G06F 3/0484* (2013.01); *G06F 3/14* (2013.01); *H04L 67/141* (2013.01)

(58) Field of Classification Search
CPC .... G06F 3/04817; G06F 3/0484; G06F 3/048; G06F 3/14; H04L 67/141
See application file for complete search history.

(56) References Cited

U.S. PATENT DOCUMENTS 7,136,999 B1 11/2006 Griffiths
8,717,166 B2 5/2014 Diem
9,363,221 B1 * 6/2016 Ozog .................... H04L 67/306
9,491,130 B1 * 11/2016 Erickson ............... H04W 4/021
9,733,811 B2 8/2017 Rad et al.
9,959,023 B2 5/2018 Rad et al.
9,961,535 B2 * 5/2018 Bucchieri ............... H04L 67/54
10,142,778 B2 11/2018 Banerjea
10,203,854 B2 2/2019 Rad et al.
11,088,986 B2 8/2021 Barfield, Jr. et al.
11,159,909 B2 10/2021 Anderson
11,259,265 B2 2/2022 Burrell et al.
(Continued)

OTHER PUBLICATIONS

Appleinsider.com [online], "Apple sued over AirDrop technology," Oct. 4, 2018, retrieved on Nov. 8, 2024, retrieved from URL <https://appleinsider.com/articles/18/10/04/apple-sued-over-airdrop-technology>, 18 pages.

*Primary Examiner* — Matthew Ell
(74) *Attorney, Agent, or Firm* — Fish & Richardson P.C.

(57) ABSTRACT

A first user-device comprises a first directional-network module; a first display screen; and at least one first processor and first memory. A second user-device comprises a second directional-network module; a second display screen; and at least one second processor and second memory. The first user device is configured to execute a social-connection application; determine that the second user-device is also executing the social-connection application; determine a distance and a first direction; display a first GUI of the social-connection application; receive, a first user input from a first user to request a connection to the second user; send, to the second user-device using the first directional-network module, a connection-request message; receive, through the first directional-network module, a connection-acceptance message; and display, through the GUI on the first display screen, an indication that the second user has accepted the request for the connection.

31 Claims, 6 Drawing Sheets

(56) References Cited

U.S. PATENT DOCUMENTS

| | | | | |
|---|---|---|---|---|
| 11,320,509 | B2 | 5/2022 | Ertan et al. | |
| 2004/0153557 | A1* | 8/2004 | Shochet | H04L 51/212<br>709/205 |
| 2018/0241580 | A1* | 8/2018 | Chen | H04L 12/1818 |
| 2019/0208377 | A1* | 7/2019 | Nebel | H04W 4/21 |
| 2020/0396561 | A1* | 12/2020 | Zheng | H04L 69/28 |
| 2023/0137352 | A1* | 5/2023 | Gottehrer | H04M 1/72403<br>709/219 |

* cited by examiner

USER DEVICES WITH DIRECTIONAL NETWORKING FOR DISCOVERABILITY

CLAIM OF PRIORITY

This application claims priority under 35 USC § 119(e) to U.S. Patent Application Ser. No. 63/440,875, filed on Jan. 24, 2023, the entire contents of which are hereby incorporated by reference.

TECHNICAL FIELD

This document describes computing devices that use directional networking hardware and software to identify other computing devices and determine relative locations in a physical environment for user-facing applications, and specifically improvements to conventional technologies and methods that enable the computing devices, and/or the network(s) connecting them, to operate in an improved manner.

BACKGROUND

Wireless communication includes the transfer of information between two or more points without the use of an electrical conductor, optical fiber, or other continuous guided medium for the transfer. Many wireless technologies use radio waves. With radio waves, intended distances can be short, such as a few meters for Bluetooth, or as far as millions of kilometers for deep-space radio communications. These technologies encompass various types of fixed, mobile, and portable applications, including two-way radios, cellular telephones, personal digital assistants (PDAs), and wireless networking. Other examples of applications of radio wireless technology include GPS units, garage door openers, wireless computer mouse, keyboards and headsets, headphones, radio receivers, satellite television, broadcast television, and cordless telephones.

One type of computer application that makes use of the above-described technologies is an online dating application, which is an online dating service presented through a mobile phone application (app) or web browser. Such apps aim to simplify and speed up the process of sifting through potential dating partners, chatting, flirting, and potentially meeting or becoming romantically involved.

SUMMARY

User devices can use directional networking to identify other user devices setup to be discovered. For example, two or more users may install applications on their phones for social connections like a dating connection, business networking, or to connect with other expatriates or locals in a foreign country. The user devices can passively discover other user devices with this application, and, when found, show the user the location of where the other users' devices (and presumably the other users) are in the immediate physical environment (e.g., in the same room, lobby, outdoor cafe, park, concert) with precise accuracy. Then, one of the users can initiate a connection to another discovered user using the user devices. For example, an interested user can send an electronic request to the other user via their user devices, the other user can accept the request, and the two users can communicate through electronic-chat, verbal face-to-face conversation, or any other appropriate social meeting.

Such an application can use networking technology that provides information about the distance and relative direction between nodes (e.g., the user devices) in the network. For example, the user device can determine a distance (e.g., in meters, feet, or other appropriate unit) and direction (e.g., in degrees, radians, or other appropriate unit) to other user devices that have the same or similar application installed, have discovery enabled, etc.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system can be used for identifying locations of peer computing-devices in a physical environment. The system can include a first user-device with a first directional-network module; a first display screen; and at least one first processor and first memory. The system also includes a second user-device with a second directional-network module; a second display screen; and at least one second processor and second memory. The first user-device is configured to: execute a social-connection application; determine that the second user-device is also executing the social-connection application; determine, using the first directional-network module, a distance to the second user-device and a first direction to the second user-device relative to the first user-device using a direct-communication link between the first directional-network module and the second directional-network module; responsive to determining the distance and the direction, display a first GUI of the social-connection application on the first display screen, the first GUI comprising a first map display showing a second icon for a second user associated with the second user-device at a second position based on the distance and the second direction; receive, through the first display screen, a first user input from a first user to request a connection to the second user; responsive to receiving the first user input, send, to the second user-device using the first directional-network module, a connection-request message; receive, through the first directional-network module, a connection-acceptance message; and display, through the first graphic user interface (GUI) on the first display screen, an indication that the second user has accepted the request for the connection. The second user device is configured to: execute the social-connection application; receive, through the second directional-network module, the connection-request message; determine, using the second directional-network module, the distance to the first user-device and a second direction to the first user-device relative to the second user-device using the direct-communication link between the first directional-network module and the second directional-network module display a second GUI of the social-connection application on the second display screen, the GUI comprising a second map display showing a first icon for the first user associated with the first user-device at a first position based on the distance and the first direction; receive a second user input to accept the connection to the first user; and responsive to receiving the second user input, send, to the first user-device using the second directional-network module, the connection-acceptance message. Other embodiments of this aspect include corresponding computer systems, apparatus, and computer programs recorded on one or more computer storage devices, each configured to perform the actions of the methods.

Implementations may include one or more of the following features. The system where the first icon may include a first image of the first user and at least one first metadata display of the first user, and where the second icon may include a second image of the second user and at least one second metadata display of the second user. The direct-communication link is a Bluetooth 5.1 connection free of intermediary routers. The connection-request message and the connection-acceptance message are not stored in a third-party server. The social-connection application is configured to operate in an enabled mode and to operate in a disabled mode that is not discoverable. The first user-device is further configured to: determine that a third user-device is also executing the social-connection application; determine, using the first directional-network module, a third distance to the third user-device and a third direction to the third user-device relative to the first user-device using a third direct-communication link between the first directional-network module and the third directional-network module; responsive to determining that the third distance and the third direction, display the first GUI of the social-connection application on the first display screen, the first GUI may include a first map display further showing a third icon for a third user associated with the third user-device at a third position based on the third distance and the third direction. The first user-device and a fourth user-device running the social-connection application form a user-group for discovery and connections as a group of users. The indication that the second user has accepted the request for the connection may include an interactive chat GUI for electronic communication between the first user and the second user. The indication that the second user has accepted the request for the connection may include an indication that the second user has invited the first user to approach the second user in the physical environment. The second user input may include a tap on the second display screen. The second user input may include a detection by the second user-device that the second user has moved a threshold distance relative to the first user. The second user input may include a detection by the second user-device that the second user has reached less than a threshold distance to the first user. The first user has associated a first profile specifying that the first user speaks a particular language; the second user has associated a second profile specifying that the second user also speaks the particular language; and the connection-request includes data specifying that both the first user and the second user speak the particular language. The first user has associated a first profile specifying that the first user speaks a first language; the second user has associated a second profile specifying that the second user a second language; and the connection-request includes data usable to translating between the first language and the second language. The social-connection application records data indicating if a user has passed a third-party verification operation. The system further may include a fifth user-device may include: a directionless-network module capable of communicating with the first directional-network module and of communicating with the second directional-network module but unable to determine directions in the physical environment; a fifth display screen; at least one fifth processor and fifth memory; where the fifth user-device is configured to: determine other distances and other directions based on distance based on data received through directionless-network using a directionless direct-communication links with the first directional-network module; and responsive to determining the other distances and the other directions, displaying a fifth GUI of the social-connection application on the fifth display screen, the fifth GUI may include a fifth map display showing the first icon and the second icon based on the other distances and the other directions. The first directional-network module creates only a single data link with the second directional-network module. Implementations of the described techniques may include hardware, a method or process, or computer software on a computer-accessible medium.

One general aspect includes a first user-device for identifying locations of peer computing-devices in a physical environment, the first user-a first directional-network module. The first user-device also includes a first display screen. The device also includes at least one first processor and first memory. The device also includes and where the first user-device is configured to: execute a social-connection application. The device also includes determine that a second user-device is also executing the social-connection application, the second user device may include: a second directional-network module. The device also includes a second display screen. The device also includes at least one second processor and second memory. The device also includes determine, using the first directional-network module, a distance to the second user-device and a first direction to the second user-device relative to the first user-device using a direct-communication link between the first directional-network module and the second directional-network module. The device also includes responsive to determining the distance and the direction, display a first GUI of the social-connection application on the first display screen, the first GUI may include a first map display showing a second icon for a second user associated with the second user-device at a second position based on the distance and the second direction. The device also includes receive, through the first display screen, a first user input from a first user to request a connection to the second user. The device also includes responsive to receiving the first user input, send, to the second user-device using the first directional-network module, a connection-request message. Other embodiments of this aspect include corresponding computer systems, apparatus, and computer programs recorded on one or more computer storage devices, each configured to perform the actions of the methods.

Implementations may include one or more of the following features. The first user-device where the first icon may include a first image of the first user and at least one first metadata display of the first user, and where the second icon may include a second image of the second user and at least one second metadata display of the second user. The direct-communication link is a Bluetooth 5.1 connection free of intermediary routers. The connection-request message and the connection-acceptance message are not stored in a third-party server. The social-connection application is configured to operate in an enabled mode and to operate in a disabled mode that is not discoverable. The first user-device is further configured to: determine that a third user-device is also executing the social-connection application; determine, using the first directional-network module, a third distance to the third user-device and a third direction to the third user-device relative to the first user-device using a third direct-communication link between the first directional-network module and the third directional-network module; responsive to determining that the third distance and the third direction, display the first GUI of the social-connection application on the first display screen, the first GUI may include a first map display further showing a third icon for a third user associated with the third user-device at a third position based on the third distance and the third direction. The first user-device and a fourth user-device running the social-connection application form a user-group for discovery and connections as a group of users. The indication that the second user has accepted the request for the connection may include an interactive chat GUI for electronic communication between the first user and the second user. The indication that the second user has accepted the request for the connection may include an indication that the second user has invited the first user to approach the second user in the physical environment. The second user input may include a tap on the second display screen. The second user input may include a detection by the second user-device that the second user has moved a threshold distance relative to the first user. The second user input may include a detection by the second user-device that the second user has reached less than a threshold distance to the first user. The first user has associated a first profile specifying that the first user speaks a particular language; the second user has associated a second profile specifying that the second user also speaks the particular language; and the connection-request includes data specifying that both the first user and the second user speak the particular language. the first user has associated a first profile specifying that the first user speaks a first language; the second user has associated a second profile specifying that the second user a second language; and the connection-request includes data usable to translating between the first language and the second language. The social-connection application records data indicating if a user has passed a third-party verification operation. The first directional-network module creates only a single data link with the second directional-network module. Implementations of the described techniques may include hardware, a method or process, or computer software on a computer-accessible medium.

Implementations can include any, all, or none of the following features. The technology described here may provide users with connections to other users via computing technology that enables improvements such as enhanced openness to connections and better, increased, and direct physical access to other users. A person's receptiveness to new connections can be difficult to communicate to strangers or acquaintances, but this technology aids in making connections and starting conversations that would otherwise not take place. For example, a cautious person may be interested in initiating a face-to-face interaction (e.g., in pursuit of a dating relationship) with another person but, even if the two users may have already engaged in remote communications with each other (whether text-based, audio-based, and/or video-based), that cautious person remains reluctant to do so until, for example, he or she has had an opportunity to visually observe (and/or hear) the other person in an environment that offers relatively close physical proximity between the two. For another example, a shy person may be interested in meeting someone (e.g., in pursuit of a dating relationship), but is not interested in a direct face-to-face discussion and would prefer to electronically instant message.

However, if both people are using this technology and are interested in finding a new dating partner, they can use their phones to discover that the other is in fact interested and would like to meet. As such, this technology can be used to overcome classic and persistent human interaction problems, and can aid users in not missing possible opportunities that would otherwise be missed without this technology.

In addition, this technology and methodology can provide an avenue for connections that are free of the technological flaws of some other technologies. For example, because connections are built between two users in the same physical environment, each user will be able to see the other before deciding if they want to spend the time and energy on the connection. Malicious or dishonest users cannot hide behind false profile information to secure the connection under false pretenses. With this technology, users can be incentivized to use a clear and representative photo for their profile, instead of a digitally altered or retouched photo, use their real demographic information instead of more desirable demographic information, etc., because the other user can see visually what they look like before accepting the connection. Similarly, the use of false profiles—sometimes called “catfishing”—is avoided because the user profile is only used as a part of the connection, which also uses direct visual observation before the connection is started or completed. Similarly, one user can spend some time thinking about their choice to request a connection and see how the other user is behaving before deciding to request the connection. One user may be interested only in dating assertive people, and may look to see if the other person leads a conversation with their friends or passively listens. Another user may want to avoid rude partners, and may watch to see if the other person is polite or rude to the wait staff at a restaurant before requesting a connection or responding to a connection request.

The lower-level hardware and software used in this technology can provide a number of technological advantages as well. For example, this technology can use directional networking that provides millimeter or centimeter resolution, sufficient for differentiating between individuals in a busy location with many individuals moving around and interacting (e.g., a concert, park, or shopping center). This technology can use direct networking between nodes in the network to provide a number of advantages. Unlike some location-finding that requires wireless transmission through walls, plumbing, and other sources of electromagnetic noise to reach a satellite, direct networking allows the two nodes to connect to each other in the most likely use cases—when the two users have line of sight to each other—even if those areas are shielded from satellites—e.g., both users on a subway car traveling under the street level. Similarly, because the networking connections are direct and not to a third-party server, the users can be confident that their connection is not logged by those third-party servers, which advantageously protects the user's privacy in a way that they can understand even if they are not particularly technologically inclined. Another advantage is that communication between devices with this technology, or in this wireless ad hoc network, can still occur in the absence of a prior established wireless network, like a Wi-Fi or cellular LTE network. For example, two passengers on an airplane can use this technology to identify each other and communicate. Additionally, because these connections are made when users are in the same physical environment, users inherently have something in common with each other. In this example, the two users on an airplane can discuss their travel plans, or why they're both flying to the same destination. In other cases, users in a coffee shop can discuss their favorite drinks, or users at a concert can relate to their common musical taste.

Other features, aspects, and potential advantages will be apparent from the accompanying description and figures.

DESCRIPTION OF DRAWINGS

Like reference symbols in the various drawings indicate like elements

DETAILED DESCRIPTION

User devices use directional networking in a wireless ad hoc network (e.g., Bluetooth 5.1) to discover distance and direction to other user devices so that a dating application or other application can show a graphical user interface (GUI) with the locations of the other user devices or other users. Then, the user of the user device can request a social connection with another user, who can accept or decline the request. With this technology, two people in the same physical environment, potentially interested in dating each other, can find each other and make a mutual connection.

Figure 1:
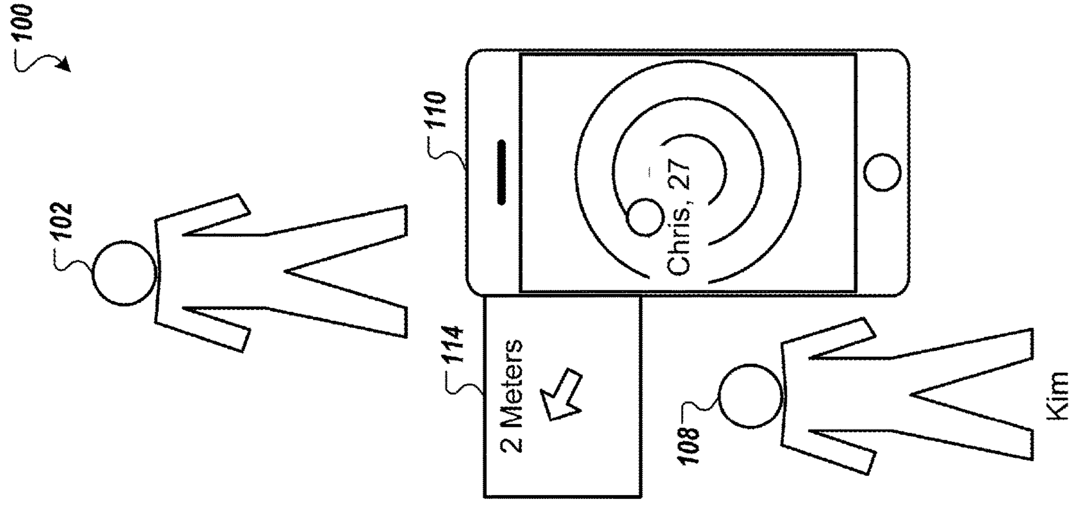
FIG. 1 shows an example of a system with user-devices capable of communicating to create social connections.
Figure 1:
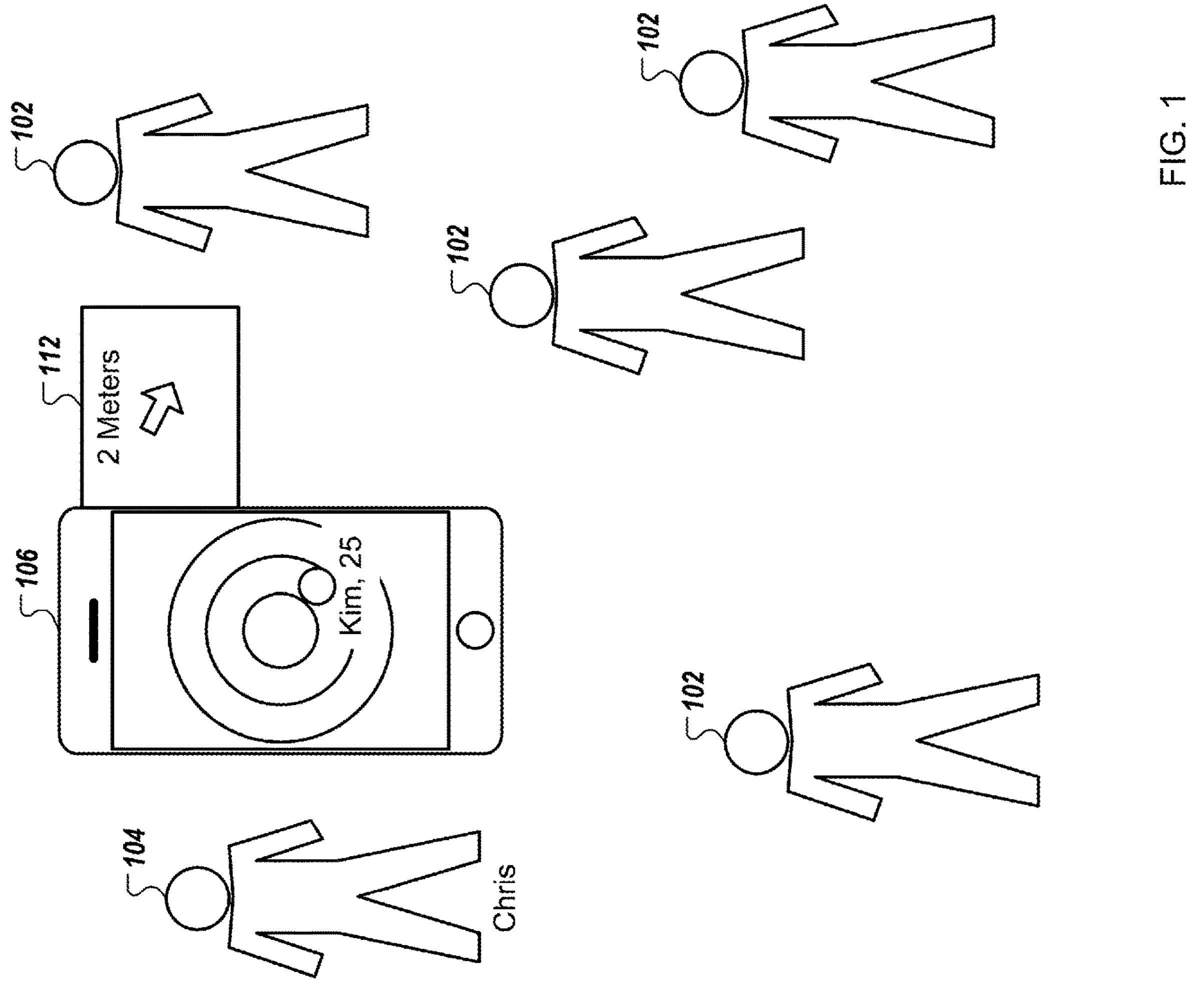

FIG. 1 shows an example of a system 100 with user-devices capable of communicating to create social connections. The system 100 can be used, for example, to identify locations of peer computing-devices in a physical environment such as a room, a store, a restaurant, sidewalk, or anywhere that people congregate. The environment is full of people 102, along with users 104 and 108. The users 104 and 108, unbeknownst to each other, are both interested in finding new dating partners and are using user-devices (e.g., smart-phones) with technology to identify other interested users. User 104's user device 106 shows a GUI with a map display, which shows the relative location of user device 110 and, thus, the user 108. Similarly, the user 108's user device 110 shows a GUI with a map display, which shows the relative location of the user device 106 and, thus, the user 104. The GUIs are configured to show enough information to allow the users 104 and 108 to visually identify each other. For example, an icon can show location, age, name, and a photo, though other types of metadata can also be shown. For example, user profile data may include a list of interests and if both users share an interest, that metadata can be identified and shown on both icons.

One of the two users 104 and 108 (user 104 for the sake of description) decides they are interested in meeting the other user. In this case, the user 104 has options to connect with or be introduced to the user. For example, the user 104 can make eye contact or wave, meaning that they initiate the connection themselves after the technology has been used to identify the potential and mutual interest. In another example, the user 104 can use their user device 106 to send a request to the user device 110 requesting a connection to the user 108. Unlike some traditional connections, in which a third person who knows both users 104 and 108 facilitates or creates a connection, the connection described here with this technology is mutually agreed upon between the two users 104 and 108 independently using the technology. This advantageously allows for connections between two people who do not yet have any mutual friends or acquaintances.

After the user 104 requests the connection, the user 108 can accept or decline the connection with their user device 110. In some cases, the connection is a request for electronic chat—text based, voice, or video chat, for example. If the user 108 accepts, the user devices 106 and 110 can create a chat instance and transition both user devices 106 and 110 to an appropriate chat GUI. In some cases, the connection is a request for face-to-face communication. For example, the request may cause a default message such as "Hi! Let's talk," request to appear on the user device 110, or a custom message such as "What do you think of the music here?" to appear on the user device 110.

Then, the user 108 can accept or decline the request depending on their preferences. There may be multiple ways to accept or decline, including other responses. In some cases, the user 108 can accept the request by indicating that the user 108 has invited the user 104 to approach them in the physical environment. This option may be of particular value for users that are shy or introverted, or that do not want to appear intimidating or confrontational. In such cases, the technology can be used to clearly and quickly allow both parties to tell the other that they welcome the physical approach, which is difficult to know with certainty in situations without this technology where other social cues could be easily misinterpreted or awkward. In some cases, the user 108 can accept the request, but only for electronic communication. This option may be of particular value for a user that isn't sure just from looking at the other user if they are interested in the connection, or if they'd like to chat more at a later time. For example, the user 104 may ask if they can come over to dance with the user 108, but the user 108 may instead decide they want to learn more about the user 104 (perhaps asking if they know how to dance,) before inviting them to approach. For another example, a user in a library might not want to converse immediately but would like to instant message chat after finishing studying, perhaps even after leaving the location. To facilitate these types of use cases, the technology can be configured to allow or prompt users to continue the instant message chat even when the two users are no longer near each other, for example by transitioning to another networking protocol such as TCP/IP that allows communication when not physically near each other. As will be appreciated, this feature can be optionally enabled or disabled on a global or individualized basis. The instant messaging described here can take various formats. For example, users can type a message on the keyboard of their user device and send it to the other user's device for display. Users can be provided with chat-room interface where their messages are showed in chronological order, or with a GUI where the messages are automatically deleted after a set time or after being read. Multimedia elements such as images, video (including live-recorded video), and sound may be supported and optionally enabled in some cases.

To facilitate this discovery process, the user devices 106 and 110 can include directional networking modules 112 and 114. These networking modules 112 and 114 can include hardware, firmware, and application software that identifies distances and directions to other user devices. These modules 112 and 114 can be configured to create direct connections in a wireless ad hoc network. That is to say, the network connections can be wirelessly transmitted by module 112 and received by 114, and vice versa, without being routed or repeated by an intermediary network node. Such an arrangement provides for a number of possible technological advantages. For example, the user devices 106 and 110 can generally be capable of making data connections with any other user device within line of sight, which is also a common use case for this technology. As another example, the users 104 and 108 can use this technology and be sure that their network connection is not being routed through an intermediary that can or will log their interactions. As such, the users 104 and 108 can be more comfortable and confident undertaking a potentially socially embarrassing situation (asking for a date and being rejecting) without that embarrassing outcome being recorded and exposed to third parties.

The technology described here can be configured to operate in an enabled or disabled mode, so that the users can select when they wish to be contacted for a connection and when they wish to be left alone. For example, the user 104 may decide to temporarily disable their application when they are working, spending time with a child, at a religious service, tired, or just not in the mood, but otherwise keep their application enabled all other times. The user 108, on the other hand, may only wish to be contacted for a connection on the weekends when they visit traditional "matchmaking" places like bars, restaurants, etc., and may only enable their application at those times. When the technology is in disabled mode, the user device is not discoverable the way that the user devices 106 and 110 in prior examples are. To facilitate these types of use cases, the technology can be disabled according to one or more optional schemes. In one scheme, a schedule can be set. For example, the user may schedule the application to be automatically disabled during the hours in which they work, commute, etc. This schedule may be daily (e.g., such that each day's schedule is the same), weekly (e.g., allowing a different schedule on the weekends), or at other scheduled intervals.

In some cases, two or more users may be out together for a social event, both of whom are interested in being introduced to new people. In such a case, the two users may form a group that is discoverable, instead of each of the two being discoverable separately. In some cases, the technology can automatically discover this group (e.g., after two or more user devices spend more than a threshold amount of time together at less than a threshold distance) and prompt the users to ask if they wish to form a group, or if they wish to transition to disabled mode (e.g., if they are two users that have just been introduced as described above and would no longer wish to be discoverable while on an impromptu date).

In some cases, the technology described here can be configured to create connections for two users who each speak a language other than the dominant language in a particular geographical area. For example, two immigrants or travelers may not speak the local language, and the technology can be configured to store their spoken language and filter out discovery to only discover other users that also speak that language. In another example, two expatriated users may both speak the local language as well as their home language, and the technology may alter their icons to indicate that they both speak the home language and thus might have a greater interest in connecting. In yet another example, the technology may be configured to translate between languages. When one user speaks only one language, and the other does not speak that language or does not speak it very well, the application can be configured to automatically translate their electronic communications as they chat, facilitating with technology connections that could not or might not otherwise happen.

In some cases, the technology can record and show data indicating if a user has undergone or passed a third-party verification process. For example, the users of the technology may undergo a mandatory or optional identify verification process to confirm the personal information they've provided (e.g., name, age, sex) is accurate, and other users can be confident in the identity of who they connect with. In another example, the users of the technology may undergo a mandatory or optional criminal background check to allow other users to be confident that the people they are introduced to do not have a criminal background. In yet another example, an organization such as a school or religious order can certify that the user is a student of the school or a member of the religious order, which can allow other users to be confident that the people they are connecting with do in fact have the real-world affiliations or connections that they are representing themselves to have and that they are not being "catfished" by someone that is not who they present themselves as.

In some cases, the technology can include features to limit the number of connection requests that can be sent or received in a particular period of time. For example, this rate-limiting feature may be user-controllable to allow a user to specify that they wish to receive only one or two requests in an evening, and not be bombarded with numerous other requests. For another example, the technology may use features such as this to differentiate between different types of users or purchases. For example, a low rate limit may be enforced for trial users or free users.

The directional network modules 112 and 114 can include a single transceiver, or multiple transceivers for a single data link, and may determine distance and direction from that single data link. One such example of such a data link is a Bluetooth 5.1 datalink which can operate by measurement of phase shift of signals across an array of antennas for direction and measures of signal strength for distance in a scheme sometimes referred to as Received Signal Strength Indicator (RSSI). The directional network modules 112 and 114 can alternatively include two or more transceivers for creating two or more data links with peer devices, and can determine distance and direction based on triangulation with the two or more data links. Examples of such data links include Zigbee, Z-Wave, and 6LoWPAN. The directional network modules 112 and 114 can include a global positioning system (GPS) module. As will be appreciated, the different network technologies include various trade-offs and options. For example, Bluetooth 5.1 can offer very precise ranging and direction detection.

For readability, the description in this document generally focuses on use-cases related to dating. However, it will be appreciated that the same (or similar) technology can be used to support other uses cases such as communicating to ask questions, provide information, give comments or advice, or replace any other kind of communication traditionally done verbally. Specifically, the technology can be used when verbal communication is not possible, appropriate, or favored. For example, users could use this technology to discretely send a distress message to nearby people. A person being harassed in public could send a discrete message to their friend, a nearby police officer, or a stranger to ask for help. Similarly, a stranger may see the person in distress or being harassed and send a message to them asking if they need assistance. For another example, a person at a bar may be approached by someone they are not interested in but who does not get subtle hints to move along. The affected person can send a message to their friend asking for help to end the unwanted situation.

Figure 2:
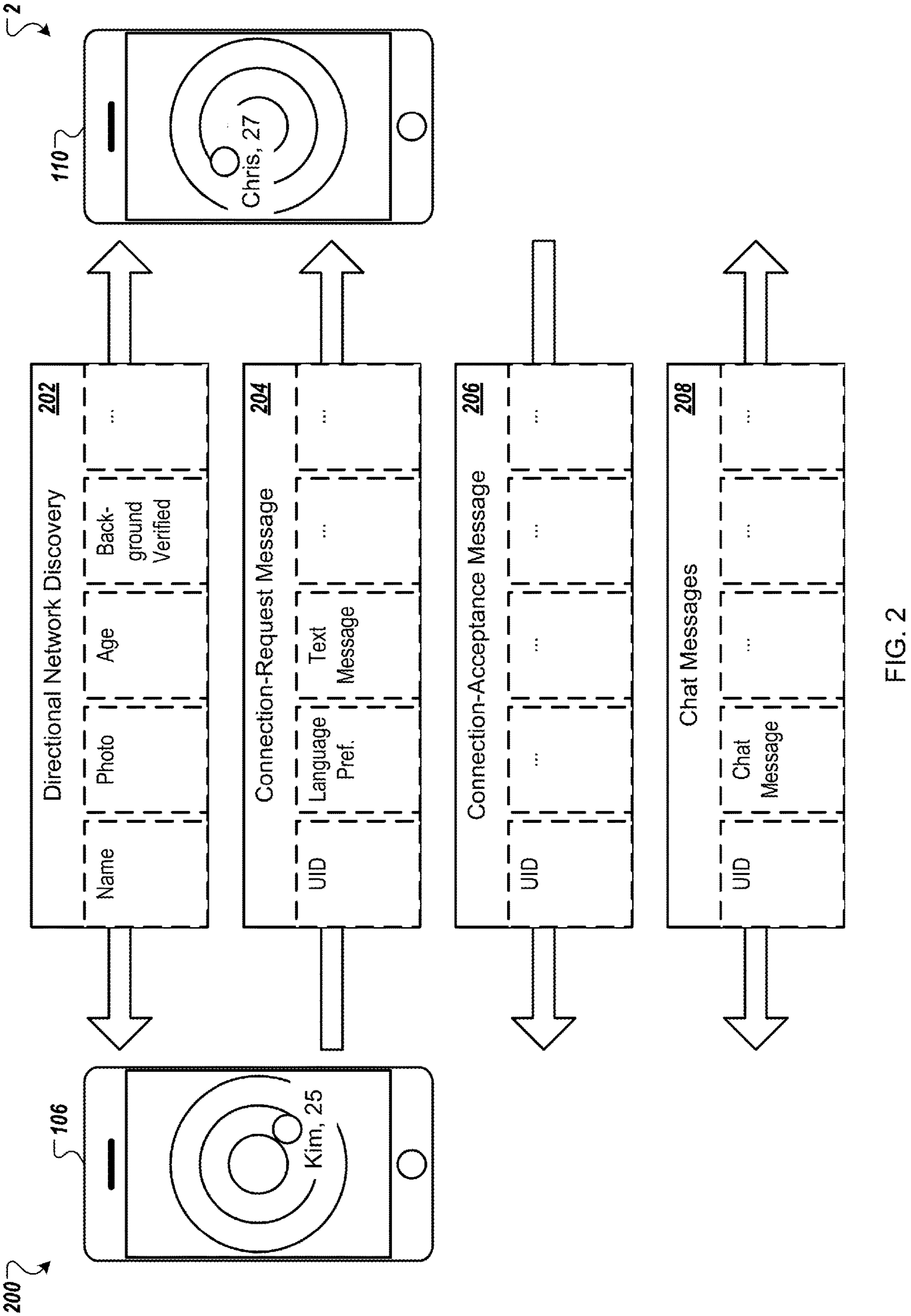
FIG. 2 shows an example of data communication between two user-devices.

FIG. 2 shows an example of data 200 communication between two user-devices 106 and 110. The user devices 106 and 110 shown here include a number of components, including a directional-network module, display screen, at least one processor, and memory. However, more, fewer, or different components are possible in other user devices. In some cases, their direct-communication link is a Bluetooth 5.1 connection free of intermediary routers, but other types of links are possible. The user devices 106 and 110 communicate with each other through the directional-network modules to transmit and receive messages 202-208. In some cases, these messages 202-208 can be combined into fewer messages, broken up into more or different messages, etc. These messages may be synchronous or asynchronous, blocking or non-blocking, or conforming to other technologically appropriate schemes.

The user devices 106 and 110 transmit and receive directional network discovery messages 202. These messages 202 can be used to identify distance and relative directions between the user devices 106 and 110. The messages 202 can include information about a user profile stored on the device 106 and 110, such as some or all of name, photo, age, background verification data, and/or other data.

A connection-request message 204 is sent from the user device 106 to the user device 110. For example, the message 204 can include information to uniquely identify the request, language preferences of the user device 106, text to include in a GUI to the user of the device 110, etc. A connection-acceptance message 206 can be returned (or a connection-rejection message, not shown) that also references the same unique identifier. In instances where electronic chat (text, voice, video, etc.) is initiated, chat messages 208 can be exchanged. The chat messages 208 can also include the same unique identifier, chat message contents, etc. In some cases, the user device 110 can automatically filter out connection-request messages 204 based on the information provided. For example, the user device 110 may be set to only show requests from users who have gone through a third-party verification process. The user device 110 may also be set to only show requests that indicate a desired age range or gender if the user of the user device 110 is only interested in such connections. For example, connection requests may only be shown from women aged 22-26 or from men over 35 years old, while other requests are automatically omitted.

Figure 3:
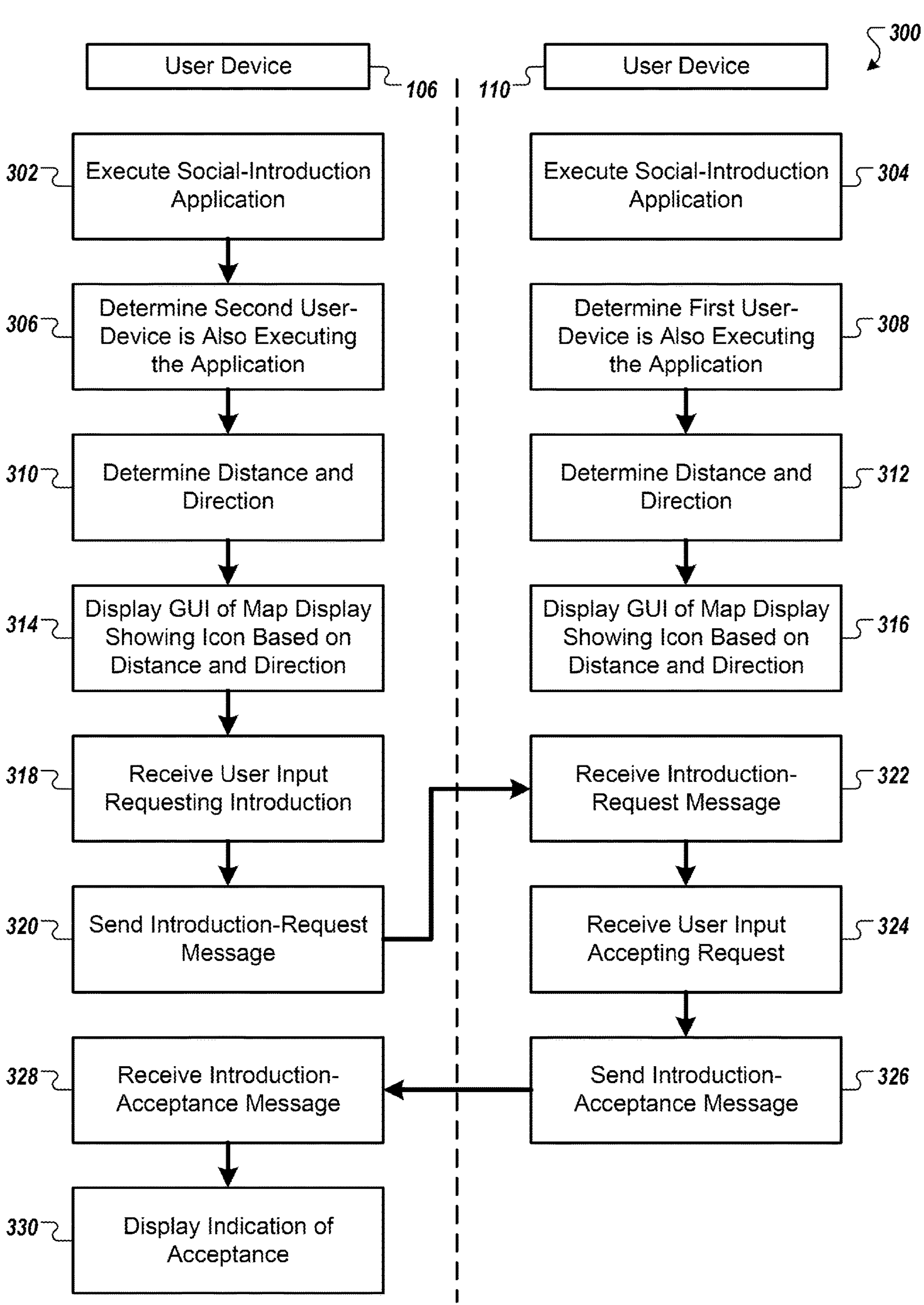
FIG. 3 shows an example process of communication between user-devices.

FIG. 3 shows an example process 300 of communication between user-devices. For example, the process 300 can be used in the system 100 using the data 200, and therefore the elements of FIG. 1 and FIG. 2 will be used as the basis for an example description. However, another system or systems can be used to perform the process 300 or a similar process.

The user devices 106 and 110 are configured to execute a social-connection application. For example, both users 104 and 108 may download a dating application to their phones and both enable the discoverability operations so that they can be alerted to other users in their physical environment that might be interested in meeting or connecting with them.

The user devices 106 and 110 are configured to determine that the other user-device is also executing the social-connection application. For example, the user devices 106 and 110 can passively monitor wireless network signals and periodically poll to determine if there are any peer devices within network range.

The user devices 106 and 110 are configured to determine, using their directional-network modules 110 and 112, distance to the other user-device and direction to the other user-device relative to the user-device using a direct-communication link between the two directional-network modules 110 and 112. For example, the user devices 106 and 110 can send and receive the directional network discovery message 202. For example, when a user device determines that there is another user device within network range, that network connection itself can be examined by the user device to determine distance and direction to the peer device, and thus its precise location. In some cases, this can be performed with the use of an internal compass and/or motion sensing hardware like an accelerometer to determine the direction of peer devices with respect to an established reference frame or direction (e.g., North). Accounting for orientation of the user devices 106 and 110 can be advantageous in presenting a GUI that is correctly oriented and understandable.

The user devices 106 and 110 are configured to, responsive to determining the distance and the direction, display a GUI of the social-connection application on the display screen. The first GUI comprises a map display showing an icon for another user associated with the other user-device at a position based on the distance and the second direction. For example, with the direction and distance to the peer user-device determined, the user device can show a map to identify, with an icon for the other user shown on the map, where the other user is in the immediate physical environment.

The user-device 106 is configured to receive, through its display screen, a user input from its user to request a connection to the other user. For example, the user 104 may tap on the icon of the user 108 shown on the GUI of their device 106 and enter a command to send a connection request to the user 108 (or their user device 110).

The user-device 106 is configured to, responsive to receiving the user input, send, to the user-device 110 using the directional-network module 112, a connection-request message. For example, the user device 106 can send the connection-request message 204. The user-device 110 is configured to receive, through the directional-network module 114, the connection-request message. For example, the user device 110 can receive the connection-request message 204.

The user-device 110 is configured to receive a user input to accept or decline the connection to the first user. For example, the user device 110 can play an alert sound and/or display a visual indicator that the connection-request message 204 was received. This can include displaying information about the user 104 that was included in the connection-request message 204.

The user 108, upon deciding that they do wish to be introduced to the user 104, can input one or more inputs accepting the request. This input can include tapping on the display screen of the user device 110 (e.g., tapping a "yes" or "accept" button, or replying with a typed-in text message). This input can include a detection by the user-device 110 that the user 108 has moved a threshold amount toward the first user. For example, the user 108 can being walking, with their user device 110, toward the user 104 and the user device 106. The user device 110 can monitor the distance to the user device 108 and, as this changes, compare the shrinking distance to a threshold value. When the movement of user device 110 is toward the user device 106 for greater than a threshold distance, or the distance between the two devices reaches below a threshold value, this can possibly be interpreted as acceptance by the user 108.

The user-device 110 is configured to, responsive to receiving the user input, send, to the user-device 106 using the second directional-network module 114, the connection-acceptance message. For example, the user device 110 can send the connection-acceptance message 208. The user-device 106 is configured to receive, through the directional-network module 112, a connection-acceptance message. For example, the user-device 106 can receive the connection-acceptance message 208.

The user-device 106 is configured to display, through the GUI on the display screen, an indication that the second user has accepted the request for the connection. For example, the user device 106 can show a GUI element stating that the request was accepted, can display a chat message sent by the user 108, or can otherwise update its GUI to show the acceptance.

Figure 4:
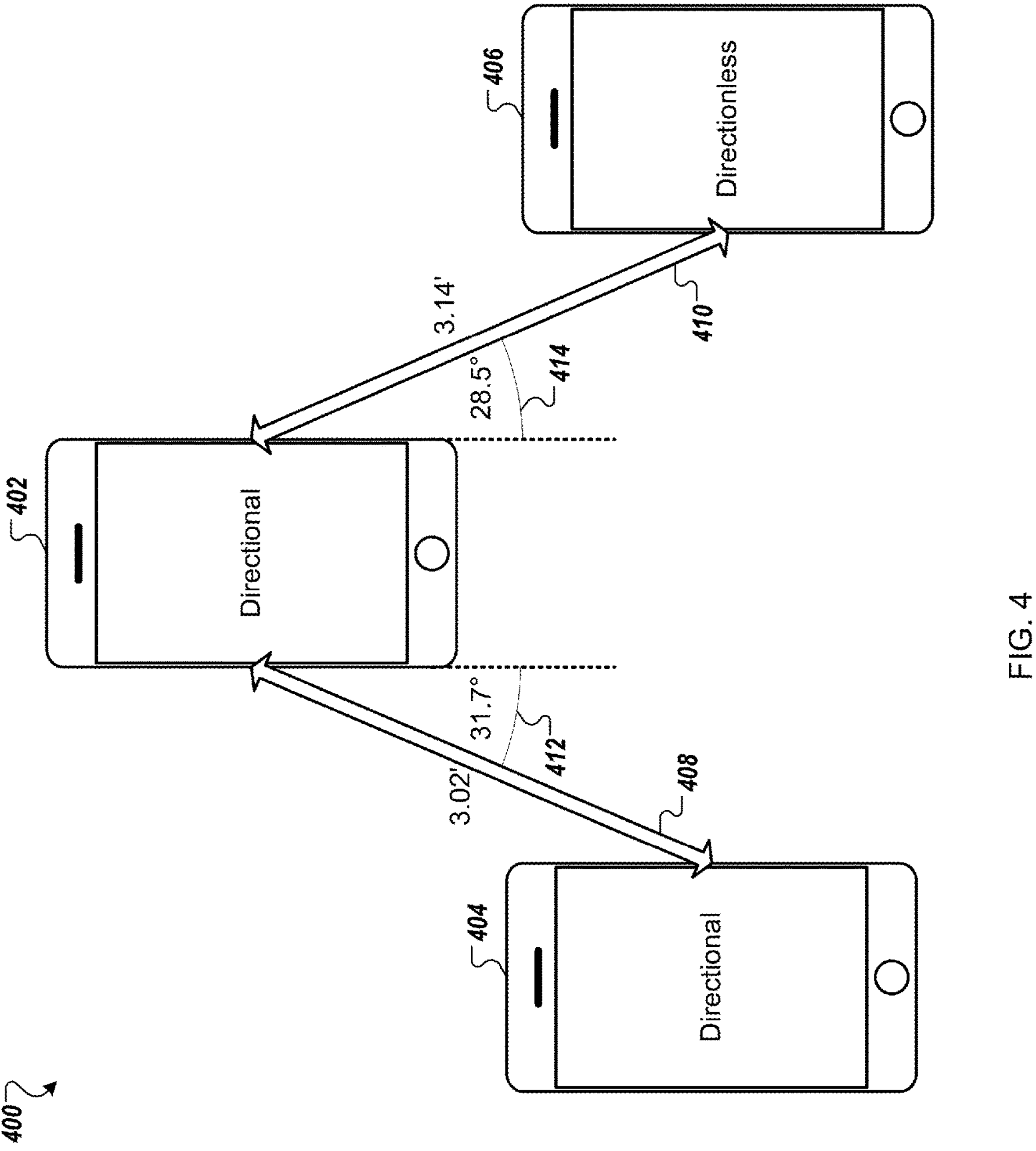
FIG. 4 shows an example of a system with a user-device capable of determining distances and directions to other user-devices.

FIG. 4 shows an example of a system 400 with a user-device 402 capable of determining distances and directions to other user-devices 404 and 406. The user devices 402 and 404 both include a directional-network module. With this directional-network module, the user-device 402 is capable of directly measuring distances 408 and 410, and angles 412 and 414.

The user device 406, on the other hand, is executing the social-connection application but does not include a directional-network module. Instead, the user device 406 includes a directionless-network module. The directionless-network module is capable of communicating with the directional-network module of the user device 402, but is not capable of measuring the distance 410 or the angle 414. For example, the user device 406 may be running an earlier version of Bluetooth in which direction and distance measuring is not supported. However, because the user device 402 is also executing the social-connection application, the user device 402 is able to communicate the distance 410 and the angle 414 to the user device 406. For example, the user device 402 can send, to the user device 406, a directional network discovery message 202 that includes values for distance and direction (e.g., 3.14' for distance 410 and 28.5° for angle 414 in this example).

For example, the user-device 402 can be configured to determine, using the first directional-network module, a third distance to a third user-device and a third direction to the third user-device relative to the first user-device using a third direct-communication link between the first directional-network module and the third directional-network module; and responsive to determining the third distance and the third direction, display the first GUI of the social-connection application on the first display screen, the first GUI comprising a first map display further showing a third icon for a third user associated with the third user-device at a third position based on the third distance and the third direction.

For example, the user device 406 can be configured to determine, using a directionless direct-communication link with the first directional-network module and the second directional-network module, other distances to the first user-device and the second user-device and other directions to the first user-device and the second user-device; and responsive to determining the other distances and the other directions, displaying a fifth GUI of the social-connection application on the fifth display screen, the fifth GUI comprising a fifth map display showing the first icon and the second icon based on the other distances and the other directions.

Figure 5:
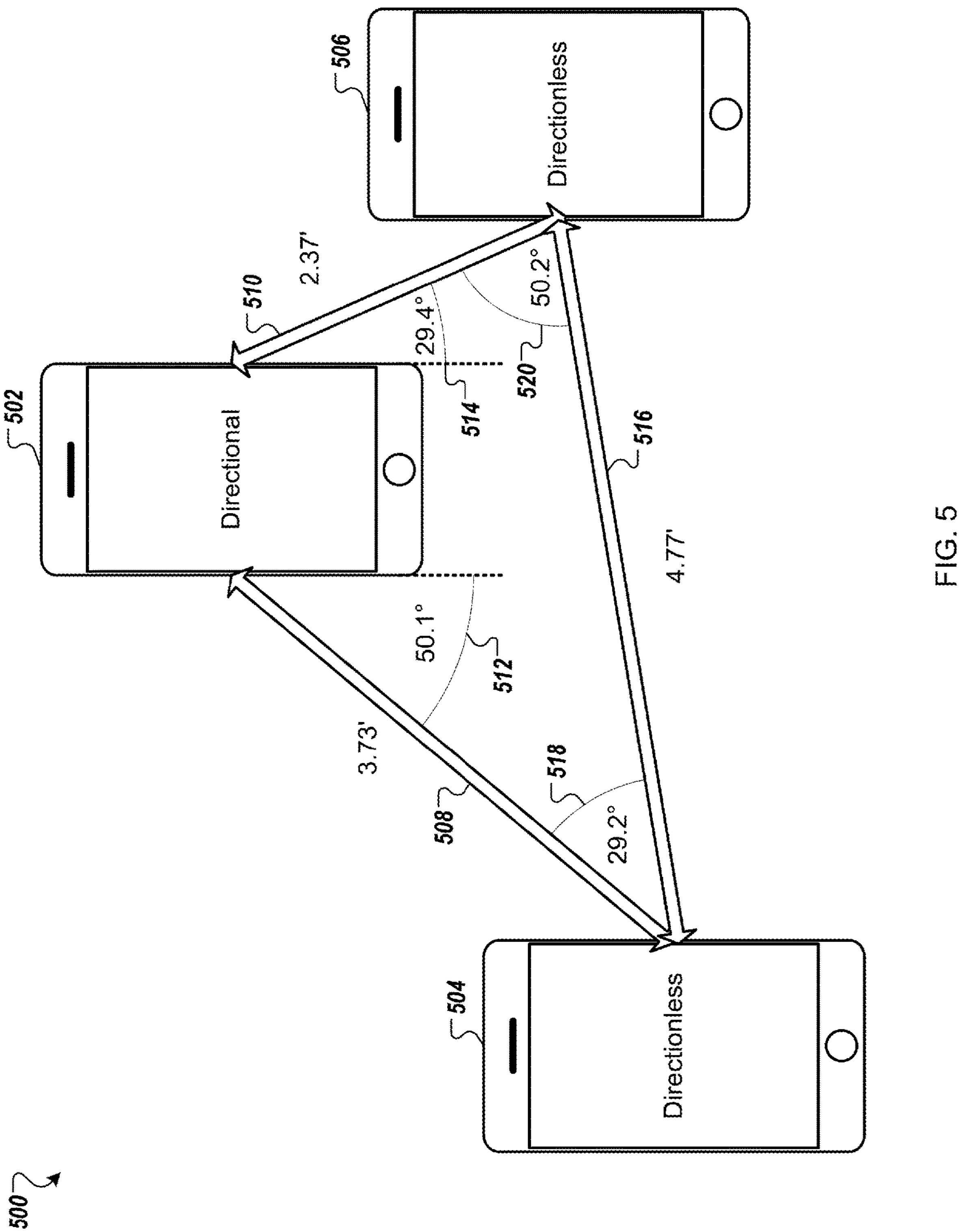
FIG. 5 shows an example of a system with user-devices without native distance and direction hardware that share information to determine distances and directions to other user-devices.

FIG. 5 shows an example of a system 500 with user-devices 504 and 506 without native distance and direction hardware that receive shared information to determine distances and directions to other user-devices, for example over a directionless network module. In this example, only the user-device 502 includes a directional-network module. In this example, the user device 502 is capable of directly measuring the distances 508 and 510, and the angles 512 and 514. Based on these distances and angles, the other distance 516, and the angles 518 and 520 can be geometrically calculated. In some instances, the user device 502 can calculate the distance 516, and the angles 518 and 520, and communicate the distances 508, 510, and 516; and the angles 512, 514, and 518 to the other user devices 504 and 506. In some instances, the user device 502 can communicate the distances 508 and 510, and the angles 512 and 514 to the user devices 504 and 506, who then each can calculate the distance 516, and the angles 518 and 520. As will be appreciated, this process can occur in ad-hoc networks with greater or fewer numbers of devices.

For example, the user device 506 can be configured to determine other distances and other directions based on data received through directionless-network using a directionless direct-communication links with the first directional-network module; and responsive to determining the other distances and the other directions, displaying a fifth GUI of the social-connection application on the fifth display screen, the fifth GUI comprising a fifth map display showing the first icon and the second icon based on the other distances and the other directions.

Figure 6:
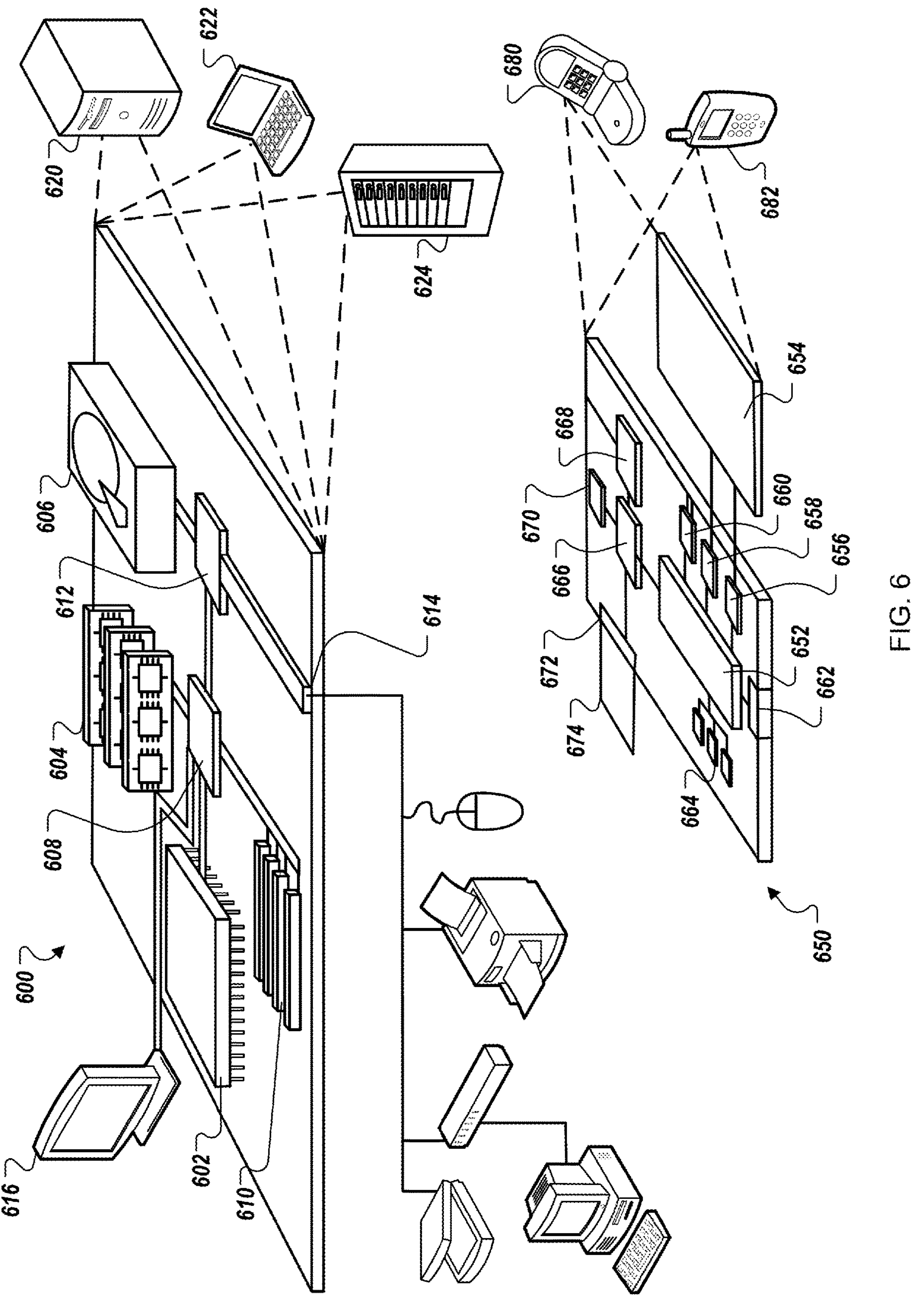
FIG. 6 shows an example of a schematic diagram of a computing device and a mobile computing device.

FIG. 6 shows an example of a computing device 600 and an example of a mobile computing device that can be used to implement the techniques described here. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various buses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the computing device 600. In some implementations, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which can accept various expansion cards (not shown). In the implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. In addition, it can be implemented in a personal computer such as a laptop computer 622. It can also be implemented as part of a rack server system 624. Alternatively, components from the computing device 600 can be combined with other components in a mobile device (not shown), such as a mobile computing device 650. Each of such devices can contain one or more of the computing device 600 and the mobile computing device 650, and an entire system can be made up of multiple computing devices communicating with each other.

The mobile computing device 650 includes a processor 652, a memory 664, an input/output device such as a display 654, a communication interface 666, and a transceiver 668, among other components. The mobile computing device 650 can also be provided with a storage device, such as a micro-drive or other device, to provide additional storage. Each of the processor 652, the memory 664, the display 654, the communication interface 666, and the transceiver 668, are interconnected using various buses, and several of the components can be mounted on a common motherboard or in other manners as appropriate.

The processor 652 can execute instructions within the mobile computing device 650, including instructions stored in the memory 664. The processor 652 can be implemented as a chipset of chips that include separate and multiple analog and digital processors. The processor 652 can provide, for example, for coordination of the other components of the mobile computing device 650, such as control of user interfaces, applications run by the mobile computing device 650, and wireless communication by the mobile computing device 650.

The processor 652 can communicate with a user through a control interface 658 and a display interface 656 coupled to the display 654. The display 654 can be, for example, a TFT (Thin-Film-Transistor Liquid Crystal Display) display or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can provide communication with the processor 652, so as to enable near area communication of the mobile computing device 650 with other devices. The external interface 662 can provide, for example, for wired communication in some implementations, or for wireless communication in other implementations, and multiple interfaces can also be used.

The memory 664 stores information within the mobile computing device 650. The memory 664 can be implemented as one or more of a computer-readable medium or media, a volatile memory unit or units, or a non-volatile memory unit or units. An expansion memory 674 can also be provided and connected to the mobile computing device 650 through an expansion interface 672, which can include, for example, a SIMM (Single In Line Memory Module) card interface. The expansion memory 674 can provide extra storage space for the mobile computing device 650, or can also store applications or other information for the mobile computing device 650. Specifically, the expansion memory 674 can include instructions to carry out or supplement the processes described above, and can include secure information also. Thus, for example, the expansion memory 674 can be provided as a security module for the mobile computing device 650, and can be programmed with instructions that permit secure use of the mobile computing device 650. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 can communicate wirelessly through the communication interface 666, which can include digital signal processing circuitry where necessary. The communication interface 666 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 668 using a radio-frequency. In addition, short-range communication can occur, such as using a Bluetooth, Wi-Fi, or other such transceiver (not shown). In addition, a GPS (Global Positioning System) receiver module 670 can provide additional navigation- and location-related wireless data to the mobile computing device 650, which can be used as appropriate by applications running on the mobile computing device 650.

The mobile computing device 650 can also communicate audibly using an audio codec 660, which can receive spoken information from a user and convert it to usable digital information. The audio codec 660 can likewise generate audible sound for a user, such as through a speaker, e.g., in a handset of the mobile computing device 650. Such sound can include sound from voice telephone calls, can include recorded sound (e.g., voice messages, music files, etc.) and can also include sound generated by applications operating on the mobile computing device 650.

The mobile computing device 650 can be implemented in a number of different forms, as shown in the figure. For example, it can be implemented as a cellular telephone 680. It can also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A system for identifying locations of peer computing-devices in a physical environment, the system comprising:

a first user-device comprising:
- a first directional-network module;
- a first display screen;
- at least one first processor and first memory; and a second user-device comprising:
- a second directional-network module;
- a second display screen;
- at least one second processor and second memory;

wherein the first user-device is configured to:
- execute a social-connection application;
- determine that the second user-device is also executing the social-connection application;
- determine, using the first directional-network module, a distance to the second user-device and a first direction to the second user-device relative to the first user-device using a direct-communication link between the first directional-network module and the second directional-network module;
- responsive to determining the distance and the direction, display a first GUI of the social-connection application on the first display screen, the first GUI comprising a first map display showing a second icon for a second user associated with the second user-device at a second position based on the distance and the second direction;
- receive, through the first display screen, a first user input from a first user to request a connection to the second user;
- responsive to receiving the first user input, send, to the second user-device using the first directional-network module, a connection-request message;
- receive, through the first directional-network module, a connection-acceptance message; and
- display, through a first graphic user interface (GUI) on the first display screen, an indication that the second user has accepted the request for the connection; and wherein the second user-device is configured to:
- execute the social-connection application;
- receive, through the second directional-network module, the connection-request message;
- determine, using the second directional-network module, the distance to the first user-device and a second direction to the first user-device relative to the second user-device using the direct-communication link between the first directional-network module and the second directional-network module;
- display a second GUI of the social-connection application on the second display screen, the GUI comprising a second map display showing a first icon for the first user associated with the first user-device at a first position based on the distance and the first direction;
- receive a second user input to accept the connection to the first user; and responsive to receiving the second user input, send, to the first user-device using the second directional-network module, the connection-acceptance message;

wherein the second user input comprises a detection by the second user-device that the second user has moved a threshold distance relative to the first user.

2. The system of claim 1, wherein the first icon comprises a first image of the first user and at least one first metadata display of the first user, and wherein the second icon comprises a second image of the second user and at least one second metadata display of the second user.

3. The system of claim 1, wherein the direct-communication link is a Bluetooth 5.1 connection free of intermediary routers.

4. The system of claim 1, wherein the connection-request message and the connection-acceptance message are not stored in a third-party server.

5. The system of claim 1, wherein the social-connection application is configured to operate in an enabled mode and to operate in a disabled mode that is not discoverable.

6. The system of claim 1, wherein the first user-device is further configured to:

determine that a third user-device is also executing the social-connection application;

determine, using the first directional-network module, a third distance to the third user-device and a third direction to the third user-device relative to the first user-device using a third direct-communication link between the first directional-network module and the third directional-network module;

responsive to determining that the third distance and the third direction, display the first GUI of the social-connection application on the first display screen, the first GUI comprising a first map display further showing a third icon for a third user associated with the third user-device at a third position based on the third distance and the third direction.

7. The system of claim 1, wherein the first user-device and a fourth user-device running the social-connection application form a user-group for discovery and connections as a group of users.

8. The system of claim 1, wherein the indication that the second user has accepted the request for the connection comprises an interactive chat GUI for electronic communication between the first user and the second user.

9. The system of claim 1, wherein the indication that the second user has accepted the request for the connection comprises an indication that the second user has invited the first user to approach the second user in the physical environment.

10. The system of claim 1, wherein the second user input comprises a tap on the second display screen.

11. The system of claim 1, wherein the second user input comprises a detection by the second user-device that the second user has reached less than a threshold distance to the first user.

12. The system of claim 1, wherein:

the first user has associated a first profile specifying that the first user speaks a particular language;

the second user has associated a second profile specifying that the second user also speaks the particular language; and the connection-request includes data specifying that both the first user and the second user speak the particular language.

13. The system of claim 1, wherein:

the first user has associated a first profile specifying that the first user speaks a first language;

the second user has associated a second profile specifying that the second user a second language; and the connection-request includes data usable to translating between the first language and the second language.

14. The system of claim 1, wherein the social-connection application records data indicating if a user has passed a third-party verification operation.

15. The system of claim 1, wherein the system further comprises a fifth user-device comprising:

a directionless-network module capable of communicating with the first directional-network module and of communicating with the second directional-network module but unable to determine directions in the physical environment;

a fifth display screen;

at least one fifth processor and fifth memory;

wherein the fifth user-device is configured to:

determine other distances and other directions based on distance based on data received through directionless-network using a directionless direct-communication links with the first directional-network module; and responsive to determining the other distances and the other directions, displaying a fifth GUI of the social-connection application on the fifth display screen, the fifth GUI comprising a fifth map display showing the first icon and the second icon based on the other distances and the other directions.

16. The system of claim 1, wherein the first directional-network module creates only a single data link with the second directional-network module.

17. A first user-device for identifying locations of peer computing-devices in a physical environment, the first user-device comprising:

a first directional-network module;

a first display screen;

at least one first processor and first memory; and wherein the first user-device is configured to:

execute a social-connection application;

determine that a second user device is also executing the social-connection application, the second user device comprising:

a second directional-network module;

a second display screen;

at least one second processor and second memory;

determine, using the first directional-network module, a distance to the second user-device and a first direction to the second user-device relative to the first user-device using a direct-communication link between the first directional-network module and the second directional-network module;

responsive to determining the distance and the direction, display a first GUI of the social-connection application on the first display screen, the first GUI comprising a first map display showing a second icon for a second user associated with the second user-device at a second position based on the distance and the second direction;

receive, through the first display screen, a first user input from a first user to request a connection to the second user;

responsive to receiving the first user input, send, to the second user-device using the first directional-network module, a connection-request message;

receive, through the first directional-network module, a connection-acceptance message; and display, through a first graphic user interface (GUI) on the first display screen, an indication that the second user has accepted the request for the connection; and wherein the second user-device is configured to:

execute the social-connection application;

receive, through the second directional-network module, the connection-request message;

determine, using the second directional-network module, the distance to the first user-device and a second direction to the first user-device relative to the second user-device using the direct-communication link between the first directional-network module and the second directional-network module;

display a second GUI of the social-connection application on the second display screen, the GUI comprising a second map display showing a first icon for the first user associated with the first user-device at a first position based on the distance and the first direction;

receive a second user input to accept the connection to the first user; and responsive to receiving the second user input, send, to the first user-device using the second directional-network module, the connection-acceptance message;

wherein the second user input comprises a detection by the second user-device that the second user has reached less than a threshold distance to the first user.

18. The first user-device of claim 17, wherein the first icon comprises a first image of the first user and at least one first metadata display of the first user, and wherein the second icon comprises a second image of the second user and at least one second metadata display of the second user.

19. The first user-device of claim 17, wherein the direct-communication link is a Bluetooth 5.1 connection free of intermediary routers.

20. The first user-device of claim 17, wherein the connection-request message and the connection-acceptance message are not stored in a third-party server.

21. The first user-device of claim 17, wherein the social-connection application is configured to operate in an enabled mode and to operate in a disabled mode that is not discoverable.

22. The first user-device of claim 17, wherein the first user-device is further configured to:

determine that a third user-device is also executing the social-connection application;

determine, using the first directional-network module, a third distance to the third user-device and a third direction to the third user-device relative to the first user-device using a third direct-communication link between the first directional-network module and the third directional-network module;

responsive to determining that the third distance and the third direction, display the first GUI of the social-connection application on the first display screen, the first GUI comprising a first map display further showing a third icon for a third user associated with the third user-device at a third position based on the third distance and the third direction.

23. The first user-device of claim 17, wherein the first user-device and a fourth user-device running the social-connection application form a user-group for discovery and connections as a group of users.

24. The first user-device of claim 17, wherein the indication that the second user has accepted the request for the connection comprises an interactive chat GUI for electronic communication between the first user and the second user.

25. The first user-device of claim 17, wherein the indication that the second user has accepted the request for the connection comprises an indication that the second user has invited the first user to approach the second user in the physical environment.

26. The first user-device of claim 17, wherein the second user input comprises a tap on the second display screen.

27. The first user-device of claim 17, wherein the second user input comprises a detection by the second user-device that the second user has moved a threshold distance relative to the first user.

28. The first user-device of claim 17, wherein:

the first user has associated a first profile specifying that the first user speaks a particular language;

the second user has associated a second profile specifying that the second user also speaks the particular language; and the connection-request includes data specifying that both the first user and the second user speak the particular language.

29. The first user-device of claim 17, wherein:

the first user has associated a first profile specifying that the first user speaks a first language;

the second user has associated a second profile specifying that the second user a second language; and the connection-request includes data usable to translating between the first language and the second language.

30. The first user-device of claim 17, wherein the social-connection application records data indicating if a user has passed a third-party verification operation.

31. The first user-device of claim 17, wherein the first directional-network module creates only a single data link with the second directional-network module.

* * * * *